United States Patent
Yoo (10) Patent No.: US 10,338,611 B2
(45) Date of Patent: Jul. 2, 2019

(54) REGULATOR

(71) Applicant: UNILOK Corporation, Incheon (KR)

(72) Inventor: Myoung Ho Yoo, Seoul (KR)

(73) Assignee: UNILOK CORPORATION, Incheon (KR)

( * ) Notice: Subject to any disclaimer, the term of this patent is extended or adjusted under 35 U.S.C. 154(b) by 0 days.

(21) Appl. No.: 15/703,379

(22) Filed: Sep. 13, 2017

(65) Prior Publication Data

US 2019/0079545 A1    Mar. 14, 2019

(51) Int. Cl.
*F16K 31/12* (2006.01)
*G05D 16/16* (2006.01)

(52) U.S. Cl.
CPC ......... *G05D 16/163* (2013.01); *G05D 16/166* (2013.01)

(58) Field of Classification Search
CPC .. G05D 16/163; G05D 16/166; G05D 16/185; F15B 2211/575; F15B 2211/565; F16K 31/1225; F16K 31/1266; F16K 31/1268
See application file for complete search history.

(56) References Cited

U.S. PATENT DOCUMENTS

| | | | | |
|---|---|---|---|---|
| 1,007,451 A * | 10/1911 | Kitts | ...................... | F25B 41/062 251/61.3 |
| 2,761,464 A * | 9/1956 | Faust | ................... | G05D 16/163 137/116.5 |
| 2,806,481 A * | 9/1957 | Faust | .................... | G05D 16/163 137/116.5 |
| 3,150,675 A * | 9/1964 | Phillips | ....................... | F15C 4/00 137/85 |
| 3,457,840 A * | 7/1969 | Grimes | ................ | F15B 11/0365 92/111 |
| 3,485,141 A * | 12/1969 | Arnold | ................. | F15B 11/0365 91/469 |
| 4,005,598 A * | 2/1977 | Ehmann | .................. | B21J 15/105 29/243.523 |
| 4,522,220 A * | 6/1985 | Multrus | .................... | F15B 5/00 137/85 |
| 5,595,209 A * | 1/1997 | Atkinson | ............ | G05D 16/0672 137/116.5 |
| 6,019,121 A * | 2/2000 | Uehara | ............... | G05D 16/0672 137/116.5 |
| 6,604,451 B1 * | 8/2003 | Yasuda | ................ | F15B 11/0365 248/550 |
| 6,742,763 B2 * | 6/2004 | Kremer | ................ | F16K 31/1221 137/383 |

(Continued)

*Primary Examiner* — Minh Q Le
(74) *Attorney, Agent, or Firm* — The PL Law Group, PLLC (57) ABSTRACT

A regulator controls a pressure of fluid. The regulator includes a body having a cavity formed therein, an inlet through which the fluid flows, an outlet through the fluid discharged, and a pilot fluid inlet; a first diaphragm located in the cavity and partitioning the cavity into a first chamber and a second chamber, the first chamber being in fluid communication with the inlet and the outlet, the second chamber being in fluid communication with the pilot fluid inlet; a first biasing mean located in the first chamber and configured to bias the first diaphragm; and a second biasing mean located in the second chamber and configured to bias the first diaphragm by being displaced based on pilot fluid pressure of the pilot fluid.

18 Claims, 4 Drawing Sheets

(56) References Cited

U.S. PATENT DOCUMENTS

| | | | |
|---|---|---|---|
| 8,534,315 B2 * | 9/2013 | Mason | G05D 16/0672 137/315.05 |
| 9,995,322 B2 * | 6/2018 | Ejiri | F16K 31/122 |
| 2009/0260699 A1 * | 10/2009 | Horiuchi | G05D 16/0672 137/599.09 |
| 2013/0074956 A1 * | 3/2013 | Okitsu | G05D 16/163 137/505 |
| 2013/0234055 A1 * | 9/2013 | Young | F16K 31/122 251/62 |
| 2015/0369370 A1 * | 12/2015 | Tanikawa | F16K 31/1225 251/14 |
| 2017/0009785 A1 * | 1/2017 | McEvoy | F15B 15/1404 |

* cited by examiner

REGULATOR

BACKGROUND

1. Technical Field

Example embodiments relate to a regulator. More particularly, the present inventive relates to a regulator for providing fluid with a constant pressure.

2. Description of the Related Art

In general, a process of depositing or etching a specific material on a substrate is performed for manufacturing a semiconductor device is performed. The apparatus for carrying out the process has a chamber for accommodating a wafer, and a supply pipe for supplying a gas into the chamber. A pressure and flow rate of the gas supplied into the chamber should be precisely controlled to maintain consistency of deposition thickness, etching thickness, etc.

The supply pipe is provided with a pump to supply a flow pressure to the gas and a regulator to supply the gas to the chamber with a constant pressure.

A typical regulator has an inlet line through which the gas flows, an outlet line through which the gas flows, and a body provided with a buffer space for connecting the inlet line and the outlet line. An opening/closing device is installed in the body, and the opening/closing device opens or closes a passage of the gas flowing into the buffer space. The opening/closing device has a seat member having an inlet and an outlet and has a rod for opening or closing the inlet of the opening/closing device. The opening/closing device is connected to a pressure setting member (e.g., a handle, a stem, or the like) for setting a reference pressure of the regulator, and the regulator supplies gas to the chamber at a constant pressure based on the reference pressure.

However, when a plurality of regulators are used for one process (e.g., a deposition process), it is not easy to set or control the reference pressures of regulators by using a handle or the like.

SUMMARY

Some example embodiments provide a regulator which is easy to control.

Some example embodiments provide a regulator enable to be controlled using a low-pressure pilot fluid.

According to example embodiments, a regulator controlling a pressure of fluid may include a body having a cavity formed therein, an inlet through which the fluid flows, an outlet through the fluid discharged, and a pilot fluid inlet; a first diaphragm located in the cavity and partitioning the cavity into a first chamber and a second chamber, (where, the first chamber is in fluid communication with the inlet and the outlet, and the second chamber is in fluid communication with the pilot fluid inlet); a first biasing mean located in the first chamber and configured to bias the first diaphragm; and a second biasing mean located in the second chamber and configured to bias the first diaphragm by being displaced based on pilot fluid pressure of the pilot fluid.

In an example embodiment, the second biasing mean may include an actuator body partitioning the second chamber into a first region and a second region along a first direction perpendicular to the first diaphragm; a first piston located in the first region and sliding in a first direction based on the pilot fluid introduced into the first region; and a second piston located in the second region and sliding in the first direction based on the pilot fluid introduced into the second region.

In an example embodiment, the first piston and the second piston may move in proportion to each other. Here, a force applied to the first diaphragm by the second biasing mean may be proportional to the pilot fluid pressure and a sum of a first surface area of the first piston and a second surface area of the second piston.

In an example embodiment, the actuator body may include an intermediate partition arranged parallel to the first diaphragm; and a support portion extending from the edge of the intermediate partition in the first direction and fixed to the second chamber. Here, a cross-sectional area of the intermediate partition may be substantially equal to a cross-sectional area of the second chamber.

In an example embodiment, the first piston may include a first O-ring disposed between an edge of the first piston and the support portion of the actuator body to seal at least a portion of the first region. The second piston may include a second O-ring disposed between an edge of the second piston and the support portion of the actuator body to seal at least a portion of the second region. The actuator body further may include a third O-ring disposed between an edge of the support portion and an inner surface of the second chamber to seal the first and second regions. Here, the first piston and the second piston may slide in the support portion of the actuator body.

In an example embodiment, the intermediate partition of the actuator body may include a first through hole communicating the first region and the second region. Here, one of the first piston and the second piston may include a protrusion formed in the first direction and connected to the other of the first piston and the second piston through the first through hole.

In an example embodiment, the second piston may include a first communication hole formed in a second surface of the second piston, and the protrusion may include a second communication hole for fluidly communicating the first region and the first communication hole. Here, the pilot fluid may flow from the second region through the first and second communication holes into the first region.

In an example embodiment, the support portion of the actuator body may include a third communication hole formed adjacent to the intermediate partition in the first region, and the second chamber may include a fourth communication hole formed on a side surface corresponding to the third communication hole. Here, a space between the second piston and the intermediate partition may be in fluid communication with atmosphere through the third and fourth communication holes.

In an example embodiment, the actuator body may include a first partition arranged in parallel with the first diaphragm.

In an example embodiment, the second biasing mean may include a first elastic member which is made of an elastic material, which has a plate shape parallel to the first diaphragm, and which is disposed between the second chamber and the first piston in the first region to elastically support the first piston; and a second elastic member which is made of an elastic material, which has a plate shape parallel to the first diaphragm, and which is disposed between the second chamber and the second piston in the second region to elastically support the second piston.

In an example embodiment, the first partition may include a first through hole communicating the first region and the second region, and one of the first piston and the second piston may include a protrusion formed in the first direction and connected to the other of the first piston and the second piston through the first through hole. Her, a sixth O-ring may be disposed between the first through hole and the protrusion of the first partition.

In an example embodiment, the second piston may include a first communication hole formed in the second surface of the second piston, and the protrusion may include a second communication hole for fluidly communicating the first region and the first communication hole. Here, the pilot fluid may flow from the second region through the first and second communication holes into the first region.

In an example embodiment, the actuator body may include a first partition having a plate shape parallel to the first diaphragm and fixed to an inner surface of the second chamber.

In an example embodiment, the first piston may include an eleventh O-ring disposed between an edge of the first piston and an inner surface of the first region to seal at least a portion of the first region, and the second piston may include a twelfth O-ring disposed between an edge of the second piston and an inner surface of the second region to seal at least a portion of the second region.

In an example embodiment, the first biasing mean may include a seat disposed in a flow path connecting the inlet and the outlet in the first chamber; a seat holder to fix the seat; a poppet which is connected to the first diaphragm, which is in contact with the seat to close the flow path, and which is spaced from the seat to open the flow path; and a poppet spring to elastically support the poppet toward the seat.

In an example embodiment, the regulator may include a second diaphragm located in the cavity and partitioning the cavity into a third chamber and a fourth chamber; a pilot poppet assembly located in the third chamber and configured to bias the second diaphragm; and a third biasing mean disposed in the fourth chamber and configured to bias the second diaphragm in accordance with an external input.

In an example embodiment, the pilot poppet assembly may include a pilot seat disposed in a pilot flow path connecting the pilot fluid inlet and the second chamber; a pilot seat holder to fix the pilot seat; a pilot poppet connected to the second diaphragm, configured to close the flow path by being in contact with the seat, and configured to open the flow path by being spaced from the seat; and a pilot poppet spring to elastically support the pilot poppet toward the pilot seat.

In an example embodiment, the second diaphragm may include a second through hole corresponding to the pilot poppet, and the fourth chamber may include a fifth communication hole in fluid communication with atmosphere. Here, the pilot poppet may be separated from the second through hole of the second diaphragm when a pilot fluid pressure of the pilot fluid in the third chamber increases to be equal to or higher than a reference pressure, and the pilot fluid is discharged an outside through the second through hole and the fifth communication hole.

According to example embodiments, a regulator controlling a pressure of fluid may include a body having a cavity formed therein, an inlet through which the fluid flows, an outlet through the fluid discharged, and a pilot fluid inlet; a first diaphragm located in the cavity and partitioning the cavity into a first chamber and a second chamber (where, the first chamber is in fluid communication with the inlet and the outlet, and the second chamber is in fluid communication with the pilot fluid inlet); a first biasing mean located in the first chamber and configured to bias the first diaphragm; and first and second pistons which are mutually of the same cross-sectional area, which are arranged in a first direction perpendicular to the first diaphragm in the second chamber, and which pressurize the first diaphragm by being displaced based on the pilot fluid.

According to example embodiments, a regulator controlling a pressure of fluid may include a body assembly having a cavity formed therein, an inlet through which the fluid flows, and an outlet through the fluid discharged, an upper portion of the body assembly being opened; a first pilot body including a pilot fluid inlet through which a pilot fluid flows, an upper body, a center body, and a lower body, a lower portion of the first pilot body being opened, the first pilot body located on the upper portion of the body assembly; a first diaphragm disposed between the body assembly and the first pilot body; a first biasing mean located in the body assembly and configured to bias the first diaphragm; a first elastic member having a plate shape parallel to the first diaphragm, the first elastic member being disposed between the central body and the lower body, the first elastic member configured to pressurize the first diaphragm by being displaced based on the pilot fluid; and a second elastic member having a plate shape parallel to the first diaphragm, the second elastic member being disposed between the upper body and the center body, the second elastic member configured to pressurize the first diaphragm by being displaced based on the pilot fluid.

Therefore, the regulator may control the pressure of the fluid constantly based on the low-pressure pilot fluid by including the second biasing mean composed of a plurality of pistons and which is operating based on the pilot fluid.

In addition, the plurality of regulators may be controlled only by controlling the pilot fluid pressure because the regulator is supplied with pilot fluid pressure from an independently configured pilot regulator.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Hereinafter, the present inventive concept will be explained in detail with reference to the accompanying drawings.

Hereinafter, it is assumed that a first direction is a vertical direction (or a longitudinal direction) and the second direction is a horizontal direction (or a transverse direction) perpendicular to the first direction. In addition, it is assumed that a first surface is a lower surface of an object and a second surface is an upper surface of the object. Similarly, it is assumed that a longitudinal section a section of the object cut in the first direction (or the vertical direction) and the cross section is a section of the object cut in the second direction (or the horizontal direction).

Figure 1:
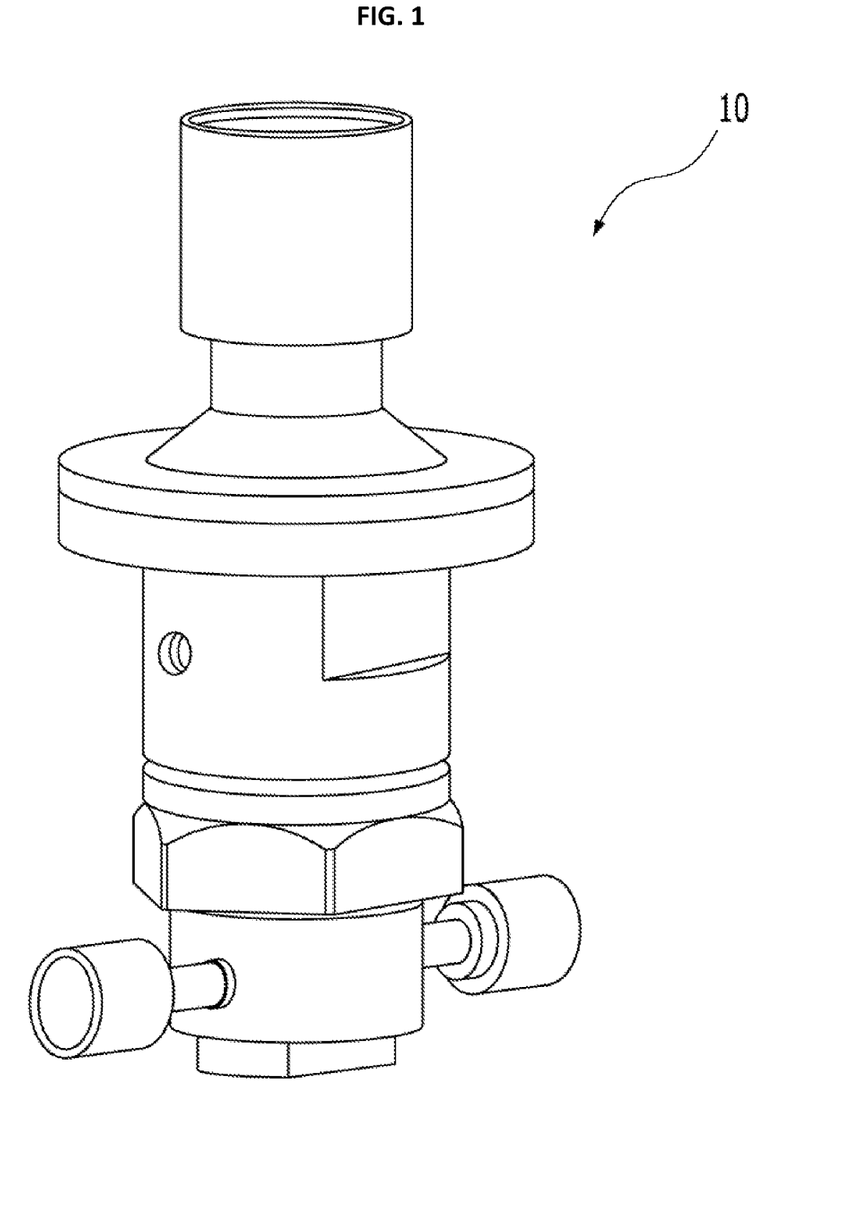
FIG. 1 is a diagram illustrating a regulator according to example embodiments.
Figure 2:
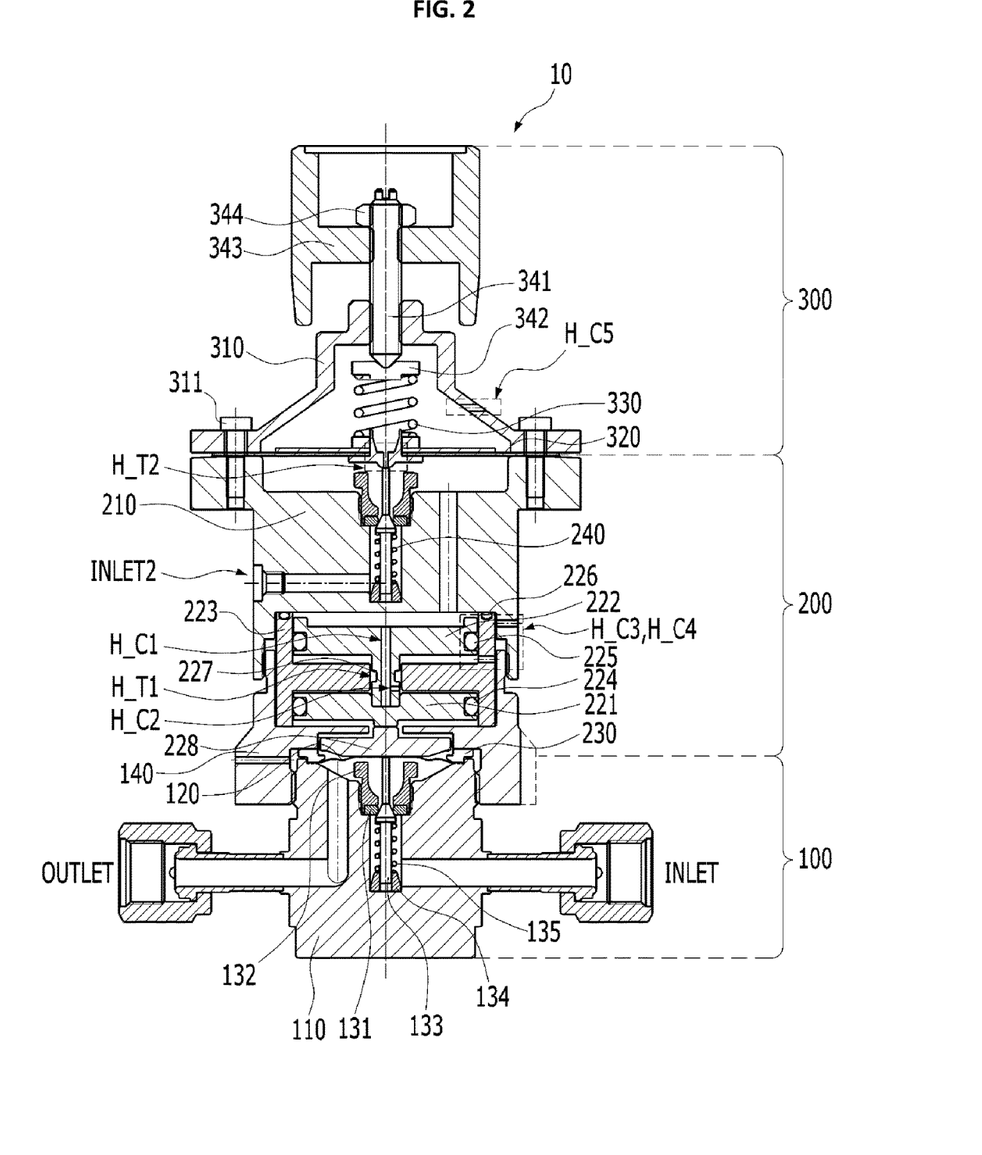
FIG. 2 is a cross-sectional diagram illustrating an example of the regulator of FIG. 1.

FIG. 1 is a diagram illustrating a regulator according to example embodiments. FIG. 2 is a cross-sectional diagram illustrating an example of the regulator of FIG. 1.

Referring to FIGS. 1 and 2, the regulator 10 may regulate a pressure of the fluid flowing through the inlet INLET and may discharge the fluid through the outlet OUTLET.

The regulator 10 may include a main regulator 100 (or a main regulator part, a main regulator unit), a pressure control part 200 (or a pressure control unit), and a pilot regulator 300 (or a pilot regulator part, a pilot regulator unit). The pilot regulator 300 may adjust a pressure of a pilot fluid (or the pilot fluid pressure) and may supply the pilot fluid to the pressure control part 200. Here, the pilot fluid may be fluid supplied to control the operation of the regulator 10. The pressure control part 200 may press (or pressurize) a first diaphragm 120, which will be described later, based on the pilot fluid pressure. The main regulator 100 may adjust the pressure of the fluid to be constant based on an operation of the first diaphragm 120.

The main regulator 100, the pressure control part 200, and the pilot regulator 300 may be formed in a main body 101.

The main body 101 may include a cavity (or internal space) formed therein and may include an inlet INLET through which the fluid flows, an outlet OUTLET through which the fluid is discharged, and a pilot fluid inlet INLET2 through which the pilot fluid flows. The main body 101 may be integrally formed or may have a body assembly 110, a connection body 140 (or a bonnet nut body), a first pilot body 210 (or a pilot upper body), and a second pilot body 310 (or a pilot bottom body).

The main regulator 100 may include a body assembly 110, a first diaphragm 120, a first biasing means 130, and a connection body 140.

The body assembly 110 may constitute a part of the main body 101 and may include the inlet INLET, the outlet OUTLET, and a fluid passage formed between the inlet INLET and the outlet OUTLET. The fluid passage may include an inlet line (or an inflow line), an outlet line (or an outflow line), and a first chamber. The inlet line may include a first horizontal portion extending horizontally from the inlet INLET toward an interior of the body assembly 110 and a first vertical portion extending vertically upward from one end of the first horizontal portion. The first chamber may be formed to be recessed inwardly from the upper surface of the body assembly 110 and may be connected to the first vertical portion of the inflow line. The outlet line may include a second vertical portion extending vertically from the first chamber and a second horizontal portion extending horizontally from one end of the vertical portion to the outlet OUTLET. The first chamber may be in fluid communication with the inlet INLET and the outlet OUTLET.

The first diaphragm 120 may be disposed on the upper surface of the body assembly 110. A lower surface of the first diaphragm 120 may form (or define) a part of the first chamber. The first diaphragm 120 may be a general diaphragm and may be implemented as a partition plate of an elastic thin film. When the main body 101 is integrally formed, the first diaphragm 120 may be located in the cavity of the main body 101, and the cavity may be divided into the first chamber and a second chamber.

The first biasing means 130 may control a flow rate of the fluid flowing from the inlet INLET to the outlet OUTLET through the first chamber. The first biasing means 130 may be disposed within the body assembly 110 (or within the first chamber) and may bias the first diaphragm 120. Here, to bias may be an operation to bias an object to one side, and the first diaphragm 120 may be deflected or displaced in a specific direction (e.g., an upward direction) in accordance with an operation of the first biasing means 130.

The first biasing means 130 may include a seat 131 (or an orifice), a seat holder 132 (or a seat retainer), a poppet 133, a poppet damper 134 and a poppet spring 135.

The seat 131 may include a hole for ejecting the fluid (or a hole through which the fluid pass), and may be disposed on a lower surface of the first chamber (or between the first chamber and the inlet line).

The seat holder 132 may be disposed on the seat 131 such that the seat 131 may be fixed. The seat holder 132 may be coupled or fixed to a lower space of the first chamber by an interference fit method, a screw connection method, or the like.

The poppet 133 may have a bar shape (or a cylindrical shape) and may extend from one end of the first vertical portion of the inlet line to the first diaphragm 120 through a hole formed in the seat 131. The poppet 133 may include a lower rod, a head (or a rod), and an upper rod. The lower rods may be disposed in the inlet line and may have a diameter smaller than a diameter of the inlet line. The head may have a mushroom shape, may be located adjacent to the seat 131, and may have a diameter larger than the diameter of a hole formed in the seat 131. The head may open and close the hole of the seat 131. The upper rod may be disposed in the first chamber and may have a diameter smaller than the diameter of the hole formed in the seat 131.

The poppet damper 134 may be disposed at one end of the first vertical portion of the inlet line and may support one end (or a lower end) of the poppet 133 or one end of the poppet spring 135. The poppet damper 134 may absorb vibration or vibrational energy transmitted through the poppet 133 or the poppet spring 135.

The poppet spring 135 may elastically support the poppet 133 toward the seat 131. The poppet spring 135 may let for the poppet 133 to be contact with the first diaphragm 120 and to operate in conjunction with the first diaphragm 120. The poppet spring 135 may surround an outer surface of the lower rod of the poppet 133 and may be disposed between the poppet 133 and the poppet damper 134.

The poppet 133 may be displaced based on force applied in the vertical direction through the first diaphragm 120. Here, the head of the poppet 133 may open or close the hole of the seat 131, or may control a distance between the hole of the seat 131 and the head of the poppet 133. Therefore, the flow rate and/or the pressure of the fluid may be controlled.

The connection body 140 may be disposed on the upper side of the body assembly 110 and may couple the main regulator 100 (or a body assembly 110) and the pressure control part 200 (or a first pilot body 210 of the control part 200). For example, the connection body 140 may include a threaded portion formed on an inner circumferential surface. Here, a portion of the connection body 140 may be coupled through a threaded line formed on an outer upper surface of the body assembly 110, and the other portion of the connection body 140 may be coupled through a thread line formed on an inner bottom surface of the first pilot body 210.

The pressure control part 200 may displace the first diaphragm 120 based on the pilot fluid (or pilot fluid pressure). The pressure control part 200 may include a first pilot body 210 and a second biasing mean 220.

The first pilot body 210 may include a pilot fluid inlet INLET2, a pilot fluid path, and the second chamber. The pilot fluid inlet INLET2 may be formed on one side of the first pilot body 210 (e.g., on the upper side). The second chamber may be formed to be recessed inwardly from the lower surface of the first pilot body 210. The pilot fluid path may be in fluid communication with the pilot fluid inlet INLET2 and the second chamber.

The pilot fluid path may include an inlet line and an outlet line. Similar to the inlet line of the main regulator 100, the inlet line of the pilot fluid path may include a third horizontal portion extending horizontally from the pilot fluid inlet INLET2 toward the interior of the first pilot body 210 and may include a third vertical portion extending vertically from one end of the third horizontal portion. The other end of the third vertical part may be connected to a third chamber which is described later. The outlet line may extend in a vertical direction from the third chamber to the second chamber and may be in fluid communication with the second chamber and the third chamber.

The second biasing mean 220 may be located in the second chamber (or the third vertical portion of the pilot fluid path) and may press the first diaphragm 120 downward while being displaced based on the pressure of the pilot fluid (i.e., the pilot fluid pressure) flowed in through the pilot fluid inlet INLET2.

The second biasing mean 220 may include a first piston 221 (or a piston upper, an upper piston), a second piston 222 (or a piston bottom, a bottom piston), and an actuator body 223.

The actuator body 223 may divide the second chamber into a first region (or a first space) and a second region (or a second space) along a vertical direction (i.e., a vertical direction perpendicular to the upper surface of the first diaphragm 120). The actuator body 223 may have a tubular shape (e.g., a cylindrical shape) having a longitudinal section of "H". The actuator body 223 may have a size (or cross-sectional area) substantially the same as or similar to a size of the second chamber. The actuator body 223 may be disposed within the second chamber.

In an example embodiment, the actuator body 223 may include an intermediate partition (or an intermediate partition wall, a barrier) and a support. The intermediate partition is arranged in parallel with the first diaphragm 120 and may isolate the first region and the second region. The intermediate partition may have a plate shape and may be made of a rigid material having little elasticity such that the intermediate partition may not be deformed by the pilot fluid pressure. An area (or a cross-sectional area) of the intermediate partition may be substantially equal to a cross-sectional area of the second chamber (or the cross-sectional area in the horizontal direction of the second chamber).

The support may extend in a vertical direction (e.g., an upward direction and a downward direction) from an edge of the intermediate partition and may be fixed to the second chamber. For example, one end (or a lower end) of the support may be fixed to the lower surface of the second chamber, and the other end (or an upper end) of the support may be fixed to the upper end of the second chamber. Here, the first piston 221 and the second piston 222 may slide in the support of the actuator body 223.

The first piston 221 may be disposed in the first region and may slide in the first direction based on the pilot fluid introduced into the first region. Similarly, the second piston 222 may be disposed in the second region and may slide in the first direction based on the pilot fluid introduced into the second region. That is, the first piston 221 and the second piston 222 may be sequentially stacked in the upward direction with respect to the first diaphragm 120 and may slide based on the pilot fluid.

In an example embodiment, the first piston 221 and the second piston 222 may have a plate shape, and one of the first piston 221 and the second piston 222 may include a protrusion which protrudes vertically. The protrusion may pass through a first through hole H_T1 (or a first-through hole) formed in the intermediate partition of the actuator body 223 (i.e., a hole communicating the first region and the second region) and may be connect the other one of the first piston 221 and the second piston 222.

For example, the second piston 222 may include a protrusion that protrudes downward from a center of a lower surface of the second piston 222. Here, the second piston 222 may have a longitudinal section of "T". The protrusion of the second piston 222 may extend through the first through hole H_T1 and may be inserted into and coupled with a groove formed in a center of an upper surface of the first piston 221. For example, the first piston 221 may include a protrusion protruding upwardly from a center of the upper surface of the first piston 221. Here, the protrusion of the first piston 221 may extend through the first through hole H_T1 and may be connected to the second piston 222.

Although the first piston 221 and the second piston 222 are described as being separated from each other, the piston 221 and the second piston 222 are not limited thereto. For example, the first and second pistons 221 and 222 may be integrally formed. However, the first piston 221 and the second piston 222 may be configured independently in terms of manufacturing (or assembling) the regulator 10. In an assembling process of the regulator 10, the first piston 221, the actuator body 223, and the second piston 223 may be disposed in the second chamber sequentially or in reverse order. Therefore, the regulator 10 (or the pressure control part 200) may be easily manufactured or assembled.

In an example embodiment, the first and second pistons 221 and 222 may include first through fourth O-rings 224 through 227.

The first O-ring 224 may be located between the edge (or outer surface) of the first piston 221 and the support of the actuator body 223 and may seal at least a portion of the first region. For example, the first O-ring 224 may isolate a first sub-region (e.g., a space located below the first piston 221) and a second sub-region (e.g., a space located above the first piston 221). Here, the first and second sub-regions may be included in the first region.

Similarly, the second O-ring 225 may be disposed between the edge (or outer surface) of the second piston 222 and the support of the actuator body 223 and may seal at least a portion of the second region. For example, the second O-ring 225 may isolate a third sub-region (e.g., a space located below the second piston 222) and a fourth sub-region (e.g., a space located below the second piston 222). Here, the third and fourth sub-regions may be included in the second region.

The third O-ring 226 may be disposed between the edge of the support of the actuator body 223 and the inner surface of the second chamber and may seal the first region and the second region. For example, the third O-ring 226 may be disposed between one end of the support and the lower surface of the second chamber. In addition, the third O-ring 226 may be disposed between the other end of the support and the upper surface of the second chamber.

The fourth O-ring 227 may be disposed between the inner surface of the first through-hole H_T1 and the protrusion (e.g., the protrusion of the first piston 221) and may perform a seal function between the first region and the second region.

In an example embodiment, the second piston 222 may include a first communication hole H_C1 formed in the upper surface, and the protrusion (for example, the protrusion of the first piston 221) may include the second communication hole H_C2. Here, the second communication hole H_C2 may be formed between the intermediate partition of the actuator body 223 and the upper surface of the first piston 222. The first communication hole H_C1 and the second communication hole H_C2 may communicate with each other through an inside of the protrusion. Therefore, the fourth sub-region of the second region (i.e., the space above the second piston 222) and the second sub-region of the first region (i.e., the space above the first piston 221) may be in fluid communication. The pilot fluid may flow into the first region from the second region through the first and second communication holes H_C1 and H_C2.

As described above, according to a structure of the second biasing mean 220, the pilot fluid may flow into only some spaces in the second chamber (i.e., the second sub-region and the fourth sub-region), and the second pistons 221 and 222 may press the first diaphragm 120.

The first piston 221 and the second piston 222 may move relative to each other according to a coupling structure of the first piston 221 and the second piston 222. Here, force applied to the first diaphragm 120 by the first piston 221 and the second piston 222 (or the force applied to the first diaphragm 120 by the second biasing mean 220) may be proportional to the pilot fluid pressure and a sum of the first area (or an upper surface area) of the first piston 221 and the second area (or an upper surface area) of the second piston 222. Therefore, the pressure controller 200 may operate with a relatively low pilot fluid pressure (or the pilot fluid having low pressure).

In an example embodiment, the support of the actuator body 223 may include a third communication hole H_C3, and the second chamber (or the first pilot body 210) may include a fourth communication hole H_C4. Here, the third communication hole H_C3 may be formed in the support of the actuator body 223 adjacent to the third sub region. The fourth communication hole H_C4 may be formed on the side surface of the first pilot body 210 corresponding to the third communication hole H_C3. In this case, the third sub-region (i.e., the space between the second piston 222 and the intermediate partition) may be in fluid communication with atmosphere through the third and fourth communication holes H_C3 and H_C4.

For reference, when the third sub-region (i.e., the space between the second piston 222 and the intermediate partition) is sealed, pressure of the third sub-region increases as the second piston 222 descends, and the pressure of the third sub-region affects an operation of the second piston 222 relative to the pilot fluid pressure. Therefore, the pressure control part 200 may allow the second biasing unit 220 to operate in a substantially proportional manner to the pilot fluid pressure by communicating the third sub-region with the atmosphere through the third and fourth communications H_C3 and H_C4.

In an example embodiment, the second biasing mean 120 may include a pusher 228. The pusher 228 may have a shape similar to that of the first piston 221, may be disposed between the first piston 221 and the first diaphragm 120, and may directly pressed across the entire area of the first diaphragm according to the operation of the first piston 221. As illustrated in FIG. 2, the pusher 228 may be disposed within the connection body 140.

In an example embodiment, the pressure control part 200 may further include a stop ring 230 and a pilot poppet assembly 240.

The stop ring 230 may be disposed above the first diaphragm 120 along the edge of the pusher 228. The stop ring 230 may limit the movement range (or movement distance) of the pusher 228.

The pilot poppet assembly 240 may control flow rate of the pilot fluid entering the third chamber through the pilot fluid inlet INLET2. The pilot poppet assembly 240 may be disposed inside the first pilot body 210 and may bias the second diaphragm 320 described later. The pilot poppet assembly 240 may include a pilot seat, a pilot seat holder, a pilot poppet, a pilot poppet damper, and a pilot poppet spring. The pilot seat, the pilot seat holder, the pilot poppet, the pilot poppet damper, and the pilot poppet spring may be substantially the same as or similar to the seat, seat holder, poppet, poppet damper and poppet spring of the first biasing mean 130 described above. Therefore, duplicated description will not be repeated.

The pilot regulator 300 may adjust or control the pilot fluid pressure of the pilot fluid provided to the pressure control part 200 to be constant.

The pilot regulator 300 may include a second pilot body 310, a second diaphragm 320 (or a rubber diaphragm), and a pilot rod spring 330 (or a third biasing mean).

The second pilot body 310 may form a part of the body 101 and may include a space formed by a lower end of the second pilot body 310 being recessed inward. Here, the space may form a part of the third chamber. The second pilot body 310 may include a fastening hole formed in a vertical direction at a lower edge thereof and may engage with the first pilot body 310 through a fastening member (e.g., a bolt). For example, the fastening member may be inserted into and fastened to a fastening hole formed along the upper edge of the first pilot body 210 through the fastening hole of the second pilot body 310.

The second diaphragm 320 may be disposed between the first pilot body 210 and the second pilot body 320. When the body 101 is integrally formed, the second diaphragm 320 may be located in the cavity of the body 101, and the cavity may be partitioned into the third chamber and the fourth chamber. The second diaphragm 320 may be substantially the same as the first diaphragm 310. For example, the second diaphragm 320 may be formed of rubber.

The pilot rod spring 330 may be disposed between an upper surface of the second pilot body 310 and the second diaphragm 320 and may press the second diaphragm 320 in the vertical direction based on an externally applied force. An intermediate member similar to the pusher 228 described above may be disposed between one end of the pilot rod spring 330 and the second diaphragm 320, and the intermediate member may press the second diaphragm 320 directly over the entire area.

The other end of the pilot rod spring 320 may be connected to one end of the stem 341 through the stem plate 342, and the stem 341 may extend in the vertical direction through the upper surface of the second pilot body 310. The other end of the stem 341 may be connected to an external handle 343 through a fastening member such as a nut 344. The stem 341 may move along the vertical direction to apply a pressure (e.g., a reference pressure) to the pilot rod spring 330 according to a rotation of the handle 343, and the second diaphragm 320 may move based on the reference press by the pilot rod spring 330.

In an example embodiment, the second diaphragm 320 may include a second through hole H_T2 corresponding to the pilot poppet, and the fourth chamber may include a fifth communication hole H_C5 in fluid communication with the atmosphere.

When the pilot fluid pressure in the third chamber (or in the second chamber) increases beyond the reference pressure, the pilot poppet may be apart from the second through hole H_T2 of the second diaphragm 320, and the pilot fluid may be discharged to the outside through the second through hole H_T2 and the fifth communication hole H_C5.

As described with reference to FIGS. 1 and 2, the regulator 10 may include the second biasing mean 220 constituted by the two-stage pistons 221 and 222 operated based on the pilot fluid, so that the regulator 10 may control the pressure of the fluid constantly based on the pilot fluid of low pressure.

Although the regulator 10 is described as including the first and second pistons 221 and 222 of two stages with reference to FIGS. 1 and 2, the regulator 10 is not limited thereto. For example, the regulator 10 may include pistons having three or more stages.

In addition, the regulator 10 is described as including the pilot regulator 300, but the regulator 10 is not limited thereto. For example, the regulator 10 may include only the remaining configurations except a configuration to adjust the pilot fluid pressure (i.e., the main regulator 100 and the hydraulic pressure control part nit 200 except the pilot regulator 300), and pilot regulator 300 may be independently configured and may supply the pilot fluid or the pilot fluid pressure to a plurality of regulators. Here, it is possible to control the plurality of regulators only by controlling the pilot fluid pressure.

Figure 3:
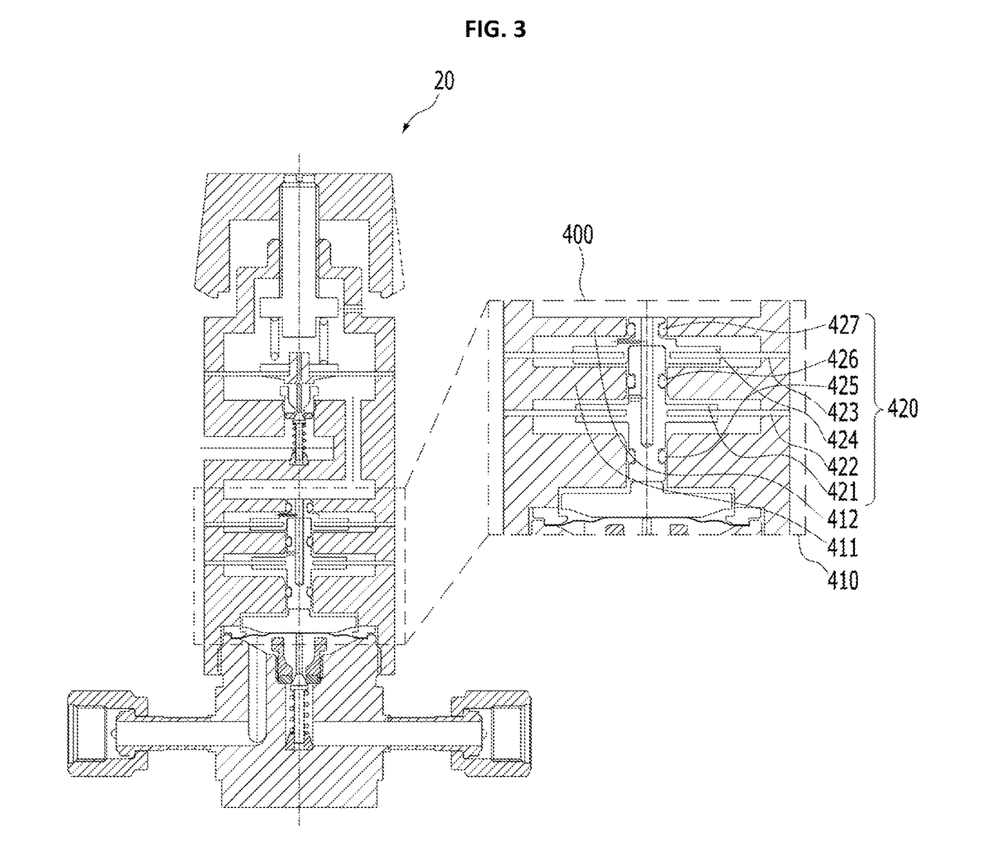
FIG. 3 is a cross-sectional diagram illustrating an example of the regulator of FIG. 1.

FIG. 3 is a cross-sectional diagram illustrating an example of the regulator of FIG. 1.

Referring to FIGS. 1 through 3, similarly to the regulator 10 described with reference to FIG. 2, the regulator 20 may regulate the pressure of the fluid flowing in through the inlet INLET and may export the fluid through outlet OUTLET.

The regulator 20 may include a main regulator 100, a pressure control part 400, and a pilot regulator 300. The main regulator 100 and the pilot regulator 300 may be substantially the same as the main regulator 100 and the pilot regulator 300 described above with reference to FIG. 1. Therefore, duplicated description will not be repeated.

The pressure control part 400 may include a first pilot body 410 (or a third pilot body) and a second biasing mean 420. The second biasing mean 420 may include first and second elastic members 421 and 423 (or elastic means, resilient means) and first and second pistons 422 and 424 (or third and fourth pistons).

The first pilot body 410 may form a part of the body 101 and may include a lower body 410a, a middle body 410b, and an upper body 410c.

The lower body 410a may be disposed on the upper portion of the body assembly 110 and may be coupled to the body assembly 110 through a screw connection method or the like, similar to the connection body 140 described with reference to FIG. 2. The lower body 410a may include a first sub-space. The first sub-space may be formed by being recessed inwardly from the upper surface of the lower body 410a and may be included in the first area described above.

The middle body 410b (or the actuator body) may have a size (or cross-sectional area in the same lateral direction) substantially the same as that of the lower body 410a and may include a first partition 411 partitioning the second chamber into the first region and the second region. The first partition 411 may be substantially the same as the intermediate partition of the actuator body 223 described with reference to FIG. 2. Therefore, duplicated description will not be repeated.

The middle body 410b may include a second sub-space and a third sub-space. The second sub-space may be formed by being recessed inwardly from the lower surface of the middle body 410b and may be included in the first region. Similarly, the third sub-space may be formed by being recessed inwardly from the upper surface of the middle body 410b and may be included in the second region. The middle body 410b may have a longitudinal section of "H"

Like the first pilot body 210 (or the upper portion of the first file body 210), the upper body 410c may include a pilot fluid inlet INLET2 and a pilot fluid passage.

The first elastic member 421 may be made of an elastic material, may have a plate shape parallel to the first diaphragm 120, and may be disposed between the lower body 410a and the middle body 410b. Here, the first piston 422 may be mounted on the first elastic member 421 and elastically supported. Alternatively, when the main body 101 is integrally formed, the first elastic member 421 may be disposed between the second chamber (or the inner surface of the second chamber) and the first piston 422 (or the side surface of the first piston 422) in the first region and may elastically support the first piston 422.

Similar to the first elastic member 421, the second elastic member 423 may be made of an elastic material, may have a plate shape parallel to the first diaphragm 120, and may be disposed between the middle body 410b and the upper body 410a. Here, the second piston 424 may be mounted on the second elastic member 423 and elastically supported. Alternatively, when the main body 101 is integrally formed, the second elastic member 423 may be disposed between the second chamber (or the inner surface of the second chamber) and the second piston 424 (or the side surface of the second piston 424) in the second region and may elastically support the second piston 424.

Similar to the first piston 221 described with reference to FIG. 2, the first piston 422 may be disposed in the first region and may slide in the first direction based on the pilot fluid introduced into the first region. The first piston 422 may include a groove formed along the side surface thereof, and the first piston 422 may be mounted to a piston mounting hole of the first elastic member 421 through the groove.

Similar to the second piston 222 described with reference to FIG. 2, the second piston 424 may be disposed in the second region and may slide in the first direction based on the pilot fluid introduced into the second region. The second piston 424 may include a groove formed along the side surface thereof, and the second piston 424 may be mounted to a piston mounting hole of the second elastic member 423 through the groove.

In an example embodiment, one of the first piston 422 and the second piston 424 may include a protrusion formed to protrude in a first direction (i.e., in a vertical direction), and the protrusion may connect the other one of the first piston 422 and the second piston 424 through the first through hole H_T1 formed in the first partition 411 of the middle body 410b.

For example, the first piston 422 may include a piston body having a plate shape, an upper protrusion formed upwardly from the piston body, and a lower protrusion formed downward from the piston body. That is, the first piston 422 may have a longitudinal section of "+".

The second piston 424 may include a piston body having a plate shape and an upper protrusion formed upwardly from the piston body. In addition, the second piston 424 may further include a groove formed at the center of the lower surface. Here, the upper protrusion of the first piston 422 may extend through a hole formed at the center of the first partition 411, and may be inserted into and coupled with the groove of the second piston 424.

In an assembling process of the regulator 20, the lower body 410a, the first elastic member 421 (or the first elastic member 421 on which the first piston 422 is mounted), the middle body 410b, the second elastic member 423 (or the second elastic member 423 on which the second piston 424 is mounted), and the upper body 410c may be disposed in the second chamber sequentially or in reverse order. Therefore, the regulator 20 (or the pressure control part 400) may be easily manufactured or assembled.

In example embodiments, the first and second pistons 422 and 424 may include fifth through seventh O-rings 425 through 427.

The fifth O-ring 425 may be disposed between the outer surface of the lower protrusion of the first piston 422 and the lower body 410a and may seal at least a portion of the first region (e.g., the first sub-space). The first sub-space may be in fluid communication with a space in which the pusher 228 is disposed, and for this purpose, the fifth O-ring 425 may be implemented as a bearing to reduce friction between the first piston 422 and the lower body 410a.

Similarly, the sixth O-ring 426 may be disposed between the outer surface of the upper protrusion of the first piston 422 and the middle body 410b (or the first partition 411 of the middle body 410b) and may seal at least a portion of the first region (e.g., the second sub-space) and at least a portion of the second region (e.g., the third sub-space). For example, the sixth O-ring 426 may seal a space above the first piston 422.

The seventh O-ring 427 may be disposed between the outer surface of the upper protrusion of the second piston 424 and the upper body 410c (or the second partition 412 of the upper body 410c) and may seal at least a portion of the second region (e.g., the fourth sub-space). A space above the second piston 424 may be in fluid communication with the third chamber, and for this purpose, similar to the fifth O-ring 425, the seventh O-ring 427 may be implemented as a bearing to reduce friction between the second piston 424 and the upper body 410c.

In an example embodiment, the second piston 424 may include a first communication hole H_C1 formed on the upper surface, and the protrusion (e.g., the upper protrusion of the first piston 422) may include a second communication hole H_C2. Here, the second communication hole H_C2 may be located in the second sub space. The first communication hole H_C1 and the second communication hole H_C2 may be in fluid communication through the inside of the protrusion. Therefore, an upper space of the second piston 424 (e.g., the fourth sub-space of the second region) and an upper space of the first piston 422 (e.g., the second sub-space of the first region) may be fluid communication, and the pilot fluid may flow into the first region from the second region through the first and second communication holes H_C1 and H_C2.

As described above, according to a structure of the second biasing mean 420, the pilot fluid may flow into only some spaces in the second chamber (i.e., the second sub-space and the fourth sub-space), and the first and second pistons 422 and 424 may press the first diaphragm 120. Therefore, regulator 20 may operate with a relatively low pilot fluid pressure (or the pilot fluid having low pressure).

Although not illustrated in FIG. 3, the third and fourth communication holes described with reference to FIG. 2 may be formed in at least one of the middle body 410b and the lower body 410c, and a space between the first piston 422 and the first partition 411 and the space below the second piston 422 may be in fluid communication with the atmosphere through the third and fourth communication holes.

Figure 4:
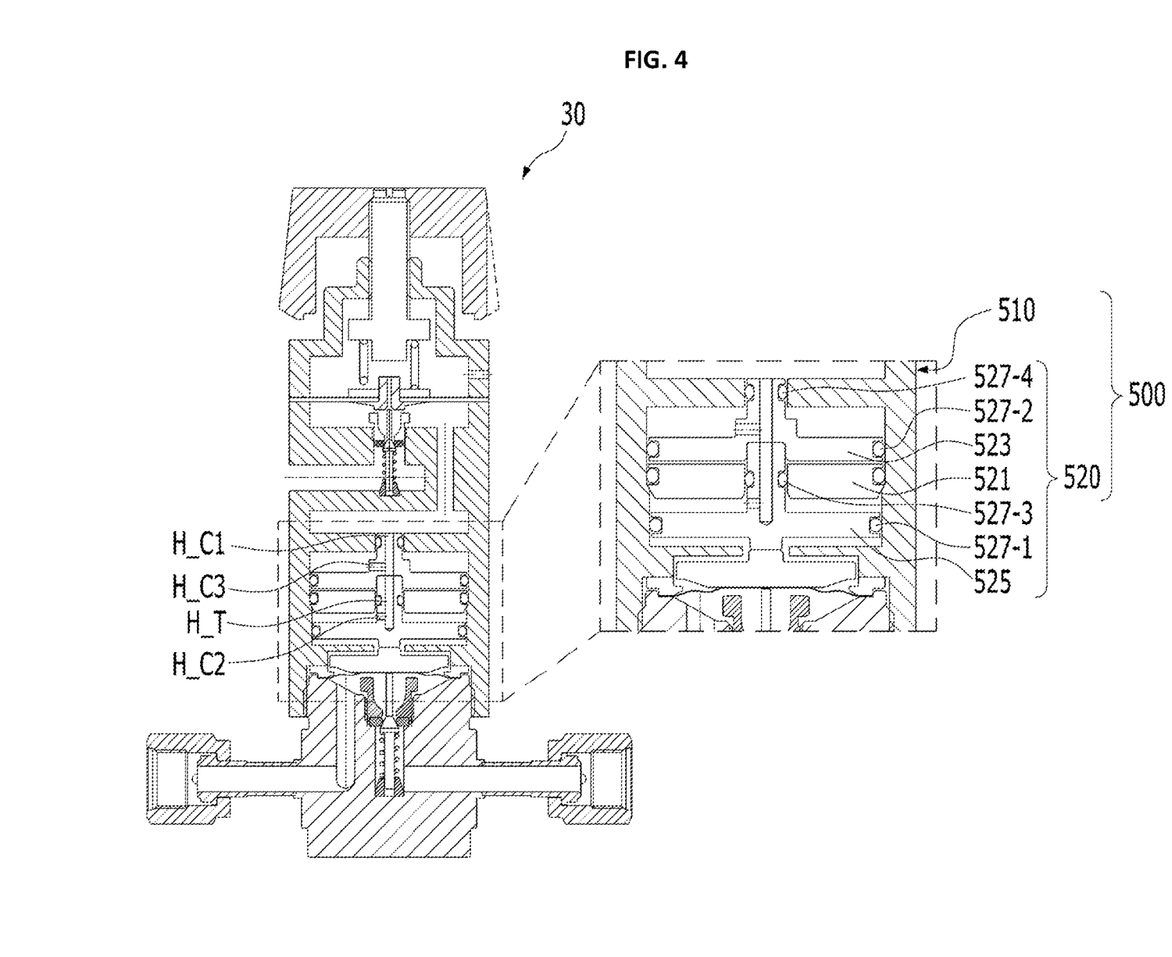
FIG. 4 is a cross-sectional diagram illustrating an example of the regulator of FIG. 1.

FIG. 4 is a cross-sectional diagram illustrating an example of the regulator of FIG. 1.

Referring to FIGS. 1 to 4, similar to the regulator 10 described with reference to FIG. 2, the regulator 30 may regulate the pressure of the fluid flowing through the inlet INLET and may export the fluid through outlet OUTLET.

The regulator 30 may include a main regulator 100, a pressure control part 500, and a pilot regulator 300. The main regulator 100 and the pilot regulator 300 may be substantially the same as the main regulator 100 and the pilot regulator 300 described above with reference to FIG. 1. Therefore, duplicated description will not be repeated.

The pressure control unit 500 may include a first pilot body 510 and a second biasing mean 520. Here, the first pilot main body 510 may be integrally formed substantially the same as the first pilot body 210 described with reference to FIG. 2 or may be formed with the first sub pilot body 511 and the second sub pilot body 512.

Similar to the second biasing mean 220 described with reference to FIG. 2, the second biasing mean 520 may be arranged in the second chamber and may press the first diaphragm 120 in the first direction (e.g., in the lower direction) by being displaced based on the pilot fluid pressure of the pilot fluid entering through the pilot fluid inlet INLET2.

The second biasing mean 220 may include a piston support 521 (or an actuator body, a first bulkhead), a first piston 523, and a second piston 525.

Similar to the actuator body 223 described with reference to FIG. 2, the piston support 521 may divide the second chamber into a first region and a second region. The piston support 521 may have a plate shape parallel to the first diaphragm 120 and may be fixed to the inner surface of the second chamber. A first through hole H_T1 may be formed at the center of the piston support portion 521.

The first piston 523 and the second piston 525 may be substantially the same as or similar to the first piston 221 and the second piston 222 described with reference to FIG. 2. Therefore, duplicated description will not be repeated.

The first piston 525 may include a first communication hole H_C1 formed on a second surface (e.g., on the upper surface) and a protrusion (e.g., an upper protrusion of the first piston 525) may include a second communication hole H_C2. Here, the second communication hole H_C2 may be formed between the piston supporting portion 521 and the upper surface of the first piston 422. Because the first communication hole H_C1 and the second communication hole H_C2 are in fluid communication through the inside of the protrusion, a space above the second piston 525 and a space above the first piston 523 are in fluid communication, and the pilot fluid may flow from the second region to the first region through the first and second communication ports H_C1 and H_C2.

The second biasing mean 520 (or the first and second pistons 523 and 525) may include eleventh through fourteenth O-rings 527-1, 527-2, 527-3, and 527-4. The eleventh through thirteenth O-rings 527-1, 527-2 and 527-3 may respectively be substantially the same as the first O-ring 224, the second O-ring 225 and the fourth O-ring 227 described with reference to FIG. 2. Also, the fourteenth O-ring 527-4 may be substantially the same as the seventh O-ring 427 described with reference to FIG. 3. Therefore, duplicated description will not be repeated.

In an assembling process of the regulator 30, the first piston 523, the piston support 521, and the second piston 525 may be disposed in the second chamber sequentially or in reverse order. Therefore, the regulator 30 (or the pressure control part 500) may be easily manufactured or assembled.

As described above, according to a structure of the second biasing mean 520, the pilot fluid may flow into only some spaces in the second chamber, and the first and second pistons 523 and 525 may press the first diaphragm 120. Therefore, regulator 30 may operate with a relatively low pilot fluid pressure (or the pilot fluid having low pressure).

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A regulator controlling a pressure of fluid, comprising:
a body having a cavity formed therein, an inlet through which the fluid flows, an outlet through the fluid discharged, and a pilot fluid inlet;
a first diaphragm located in the cavity and partitioning the cavity into a first chamber and a second chamber, the first chamber being in fluid communication with the inlet and the outlet, the second chamber being in fluid communication with the pilot fluid inlet;
a first biasing mean located in the first chamber and configured to bias the first diaphragm; and
a second biasing mean located in the second chamber and configured to bias the first diaphragm by being displaced based on pilot fluid pressure of the pilot fluid,
wherein the first biasing mean includes:
a seat disposed in a flow path connecting the inlet and the outlet in the first chamber;
a seat holder to fix the seat;
a poppet which is connected to the first diaphragm, which is in contact with the seat to close the flow path, and which is spaced from the seat to open the flow path; and
a poppet spring to elastically support the poppet toward the seat;
wherein the second biasing mean includes:
an actuator body partitioning the second chamber into a first region and a second region along a first direction perpendicular to the first diaphragm;
a first piston located in the first region and sliding in a first direction based on the pilot fluid introduced into the first region; and
a second piston located in the second region and sliding in the first direction based on the pilot fluid introduced into the second region.

2. The regulator of claim 1, wherein the first piston and the second piston move in proportion to each other, and
wherein a force applied to the first diaphragm by the second biasing mean is proportional to the pilot fluid pressure and a sum of a first surface area of the first piston and a second surface area of the second piston.

3. The regulator of claim 1, wherein the actuator body includes:
an intermediate partition arranged parallel to the first diaphragm; and
a support portion extending from the edge of the intermediate partition in the first direction and fixed to the second chamber, and
wherein a cross-sectional area of the intermediate partition is substantially equal to a cross-sectional area of the second chamber.

4. The regulator of claim 3, wherein the first piston includes a first O-ring disposed between an edge of the first piston and the support portion of the actuator body to seal at least a portion of the first region,
wherein the second piston includes a second O-ring disposed between an edge of the second piston and the support portion of the actuator body to seal at least a portion of the second region,
wherein the actuator body further includes a third O-ring disposed between an edge of the support portion and an inner surface of the second chamber to seal the first and second regions, and
wherein the first piston and the second piston slide in the support portion of the actuator body.

5. The regulator of claim 4, wherein the intermediate partition of the actuator body includes a first through hole communicating the first region and the second region, and
wherein one of the first piston and the second piston includes a protrusion formed in the first direction and connected to the other of the first piston and the second piston through the first through hole.

6. The regulator of claim 5, wherein the second piston includes a first communication hole formed in a second surface of the second piston,
wherein the protrusion includes a second communication hole for fluidly communicating the first region and the first communication hole, and
wherein the pilot fluid flows from the second region through the first and second communication holes into the first region.

7. The regulator of claim 6, wherein the support portion of the actuator body includes a third communication hole formed adjacent to the intermediate partition in the first region,
wherein the second chamber includes a fourth communication hole formed on a side surface corresponding to the third communication hole, and
wherein a space between the second piston and the intermediate partition is in fluid communication with atmosphere through the third and fourth communication holes.

8. The regulator of claim 1, wherein the actuator body includes a first partition arranged in parallel with the first diaphragm.

9. The regulator of claim 8, wherein the second biasing mean includes:
a first elastic member which is made of an elastic material, which has a plate shape parallel to the first diaphragm, and which is disposed between the second chamber and the first piston in the first region to elastically support the first piston; and a second elastic member which is made of an elastic material, which has a plate shape parallel to the first diaphragm, and which is disposed between the second chamber and the second piston in the second region to elastically support the second piston.

10. The regulator of claim 9, wherein the first partition includes a first through hole communicating the first region and the second region,
   wherein one of the first piston and the second piston includes a protrusion formed in the first direction and connected to the other of the first piston and the second piston through the first through hole, and
   wherein a sixth O-ring is disposed between the first through hole and the protrusion of the first partition.

11. The regulator of claim 10, wherein the second piston includes a first communication hole formed in the second surface of the second piston,
   wherein the protrusion includes a second communication hole for fluidly communicating the first region and the first communication hole, and
   wherein the pilot fluid flows from the second region through the first and second communication holes into the first region.

12. The regulator of claim 1, wherein the actuator body includes a first partition having a plate shape parallel to the first diaphragm and fixed to an inner surface of the second chamber.

13. The regulator of claim 12, wherein the first piston includes an eleventh O-ring disposed between an edge of the first piston and an inner surface of the first region to seal at least a portion of the first region, and
   wherein the second piston includes a twelfth O-ring disposed between an edge of the second piston and an inner surface of the second region to seal at least a portion of the second region.

14. The regulator of claim 1, further comprising:
   a second diaphragm located in the cavity and partitioning the cavity into a third chamber and a fourth chamber;
   a pilot poppet assembly located in the third chamber and configured to bias the second diaphragm; and
   a third biasing mean disposed in the fourth chamber and configured to bias the second diaphragm in accordance with an external input.

15. The regulator of claim 14, wherein the pilot poppet assembly includes:
   a pilot seat disposed in a pilot flow path connecting the pilot fluid inlet and the second chamber;
   a pilot seat holder to fix the pilot seat;
   a pilot poppet connected to the second diaphragm, configured to close the flow path by being in contact with the seat, and configured to open the flow path by being spaced from the seat; and
   a pilot poppet spring to elastically support the pilot poppet toward the pilot seat.

16. The regulator of claim 15, wherein the second diaphragm includes a second through hole corresponding to the pilot poppet,
   wherein the fourth chamber includes a fifth communication hole in fluid communication with atmosphere, and
   wherein the pilot poppet is separated from the second through hole of the second diaphragm when a pilot fluid pressure of the pilot fluid in the third chamber increases to be equal to or higher than a reference pressure, and the pilot fluid is discharged an outside through the second through hole and the fifth communication hole.

17. A regulator controlling a pressure of fluid, comprising:
   a body having a cavity formed therein, an inlet through which the fluid flows, an outlet through the fluid discharged, and a pilot fluid inlet;
   a first diaphragm located in the cavity and partitioning the cavity into a first chamber and a second chamber, the first chamber being in fluid communication with the inlet and the outlet, the second chamber being in fluid communication with the pilot fluid inlet;
   a first biasing mean located in the first chamber and configured to bias the first diaphragm;
   first and second pistons which are mutually of the same cross-sectional area, which are arranged in a first direction perpendicular to the first diaphragm in the second chamber, and which pressurize the first diaphragm by being displaced based on the pilot fluid;
   a second diaphragm located in the cavity and partitioning the cavity into a third chamber and a fourth chamber;
   a pilot poppet assembly located in the third chamber and configured to bias the second diaphragm; and
   a third biasing mean disposed in the fourth chamber and configured to bias the second diaphragm in accordance with an external input.

18. A regulator controlling a pressure of fluid, comprising:
   a body assembly having a cavity formed therein, an inlet through which the fluid flows, and an outlet through the fluid discharged, an upper portion of the body assembly being opened;
   a first pilot body including a pilot fluid inlet through which a pilot fluid flows, an upper body, a center body, and a lower body, a lower portion of the first pilot body being opened, the first pilot body located on the upper portion of the body assembly;
   a first diaphragm disposed between the body assembly and the first pilot body;
   a first biasing mean located in the body assembly and configured to bias the first diaphragm;
   a first elastic member having a plate shape parallel to the first diaphragm, the first elastic member being disposed between the central body and the lower body, the first elastic member configured to pressurize the first diaphragm by being displaced based on the pilot fluid; and
   a second elastic member having a plate shape parallel to the first diaphragm, the second elastic member being disposed between the upper body and the center body, the second elastic member configured to pressurize the first diaphragm by being displaced based on the pilot fluid;
   wherein the first biasing mean includes:
      a seat disposed in a flow path connecting the inlet and the outlet;
      a seat holder to fix the seat;
      a poppet which is connected to the first diaphragm, which is in contact with the seat to close the flow path, and which is spaced from the seat to open the flow path; and
      a poppet spring to elastically support the poppet toward the seat.

* * * * *